United States Patent [19]

Iacono

[11] Patent Number: 5,471,658
[45] Date of Patent: Nov. 28, 1995

[54] HERMETICALLY SEALED COMMUNICATION SYSTEM WITH RECHARGEABLE BATTERY

[76] Inventor: Gene A. Iacono, 1608 Morning Sun Ave., Walnut, Calif. 91789

[21] Appl. No.: 38,124

[22] Filed: Mar. 26, 1993

[51] Int. Cl.⁶ .......................... H04B 1/034; H04B 13/02; H04B 1/10; H01M 10/44
[52] U.S. Cl. .......................... 455/128; 455/40; 455/212; 320/14; 379/433
[58] Field of Search .................... 455/40, 89, 90, 455/128, 66, 212, 214, 351, 100, 218; 320/14; 362/158; 174/52.1; 359/599, 832; 379/437, 439, 433, 451–452

[56] References Cited

U.S. PATENT DOCUMENTS

| | | | |
|---|---|---|---|
| 3,105,938 | 8/1963 | Onnigian et al. | 455/100 |
| 3,172,076 | 3/1865 | Alinari | 455/40 |
| 3,794,825 | 2/1974 | Krupansky | 362/158 |
| 3,882,394 | 5/1975 | Koster et al. | 455/128 |
| 3,903,625 | 9/1975 | Augustine | 38/77.2 |
| 3,983,483 | 9/1976 | Pando | 455/89 |
| 4,121,160 | 10/1978 | Cataldo | 455/128 |
| 4,268,894 | 5/1981 | Bartunek et al. | 362/158 |
| 4,403,341 | 9/1983 | Nata | 455/128 |
| 4,503,563 | 3/1985 | Johnson | 455/351 |
| 4,725,253 | 2/1988 | Politte | 441/130 |
| 4,812,855 | 3/1989 | Coe et al. | 343/818 |
| 4,980,694 | 12/1990 | Hines | 455/89 |
| 4,980,926 | 12/1990 | Noetzel | 455/41 |
| 4,981,453 | 1/1991 | Krishan et al. | 441/6 |
| 5,020,149 | 5/1991 | Hemmie | 455/325 |
| 5,097,618 | 3/1992 | Stoffel | 43/17 |
| 5,172,031 | 12/1992 | Matsui et al. | 362/158 |
| 5,175,873 | 12/1992 | Goldenberg et al. | 455/89 |

*Primary Examiner*—Chi H. Pham
*Assistant Examiner*—Mark D. Wisler
*Attorney, Agent, or Firm*—Merchant, Gould, Smith, Edell, Welter & Schmidt

[57] ABSTRACT

A wireless fully submersible transmitter includes the substantially water-resistant casing within which there is located an audio frequency circuit, a radio frequency circuit, antenna, and a rechargeable battery. A microphone is connected through the casing between the inside of the casing and a position external the casing. A receiver includes a squelch circuit to eliminate the volume when the transmitter is submersed within water such that the RF signal from the transmitter is lost. The transmitter is operable from outside of the casing by a switch which interacts with an operable reed switch on the inside of the casing. An antenna is located inside the casing using the circuit board as the ground.

34 Claims, 3 Drawing Sheets

HERMETICALLY SEALED COMMUNICATION SYSTEM WITH RECHARGEABLE BATTERY

BACKGROUND

Providing a communication system which is effective to transmit high quality audio signals from a moist environment by radio to a receiver is valuable.

This invention relates to communication systems having a wireless connection between a transmitter and a receiver.

Wireless microphones associated with a transmitter have been known for many years. The systems use lavaliere microphones. As electronic components have reduced in size over time, these wireless transmitters have become progressively smaller. The transmitter may be hand-held or comprised of a body pack with lavaliere microphone attached.

Such wireless transmitters are used in theatrical productions, theme park productions, electronic news gathering, film production, covert police surveillance, broadcast television and religious services.

The wireless transmitter includes a microphone to pick up the original audio source, a battery-operated transmitter which includes an audio frequency (AF) means, radio frequency (RF) means and an antenna. Remote from the transmitter, there is located a receiver which is either AC or battery operated and which includes an antenna to pick up the RF signal from the transmitter. The receiver also has an audio output.

A common problem with these transmitters is the inability of the system to operate in a moist environment. In this regard, moisture caused by perspiration, water or other sources tends to destroy or corrode sensitive electronic components.

Different mechanisms have been used to endeavor to shield the microphone and antenna from moisture. Invariably, they are cumbersome and do not provide effective waterproofing. When a battery needs to be replaced in the transmitter, the case must be opened and there is the likelihood of water leakage. The mere fact that the transmitter needs to be open at least in part impacts the integrity of the unit such that water leaks can occur.

There is a need to provide a wireless transmitter for use in an environment subject to high moisture content which minimizes the above problems.

SUMMARY

By this invention, there is provided a transmitter which is substantially impervious to the ingress of water.

According to the invention, a communication system includes a transmitter and a receiver. The transmitter is included within a sealed water-resistant substantially translucent polycarbonate casing and includes audio frequency means, radio frequency means, an antenna and a rechargeable battery. There are means through the casing to connect a remote wire connected microphone with the audio frequency means. There are also contact means through the casing to connect the battery with recharger means.

Switch means in the casing is operable from outside the casing to activate or deactivate the transmitter without through-holes. A movable magnet on the outside of the casing activates a reed switch in the casing.

When the transmitter is in the operable active mode, an audio signal is inputted to the microphone via a radio frequency to the receiver. The antenna in the casing employs a circuit board constituting the base for the AF means and RF means as the ground.

The polycarbonate casing is frosted on the inside, such that water ingress into the casing is exhibited as a laminar effect on the inside of the casing. Thus, any leakage of water is visible to users. The rechargeable characteristics of the battery permits for the transmitter to operate periodically recharged for long periods of time. There is essentially no need to enter the casing. Indeed, the casing is factory sealed to prevent random entry.

The radio receiver includes a squelch device to cut-off output from the receiver audio section when RF signals from the transmitter are cut-off due to the transmitter being submerged in water.

The invention is further described with reference to the accompanying drawings.

DRAWINGS

DESCRIPTION

Figure 1:
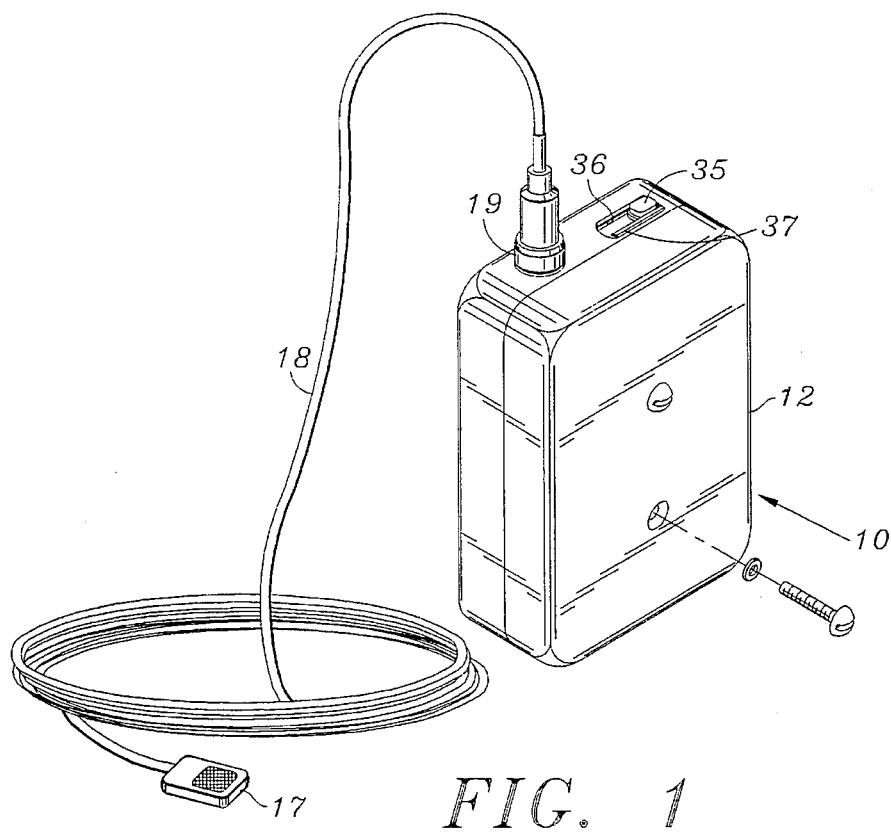
FIG. 1 is a perspective view of a transmitter illustrating the casing and a lavaliere microphone wire-connected with the transmitter.
Figure 2:
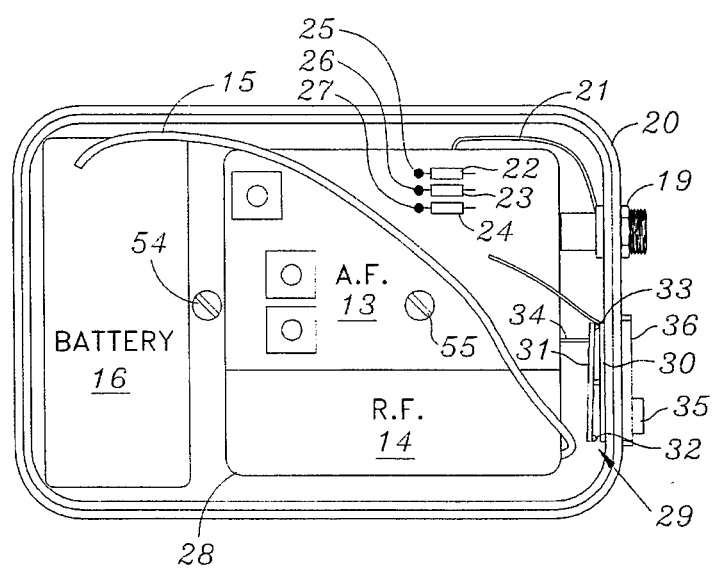
FIG. 2 is a top view of the transmitter through the translucent casing and illustrating the circuit board, battery and other components in the transmitter.
Figure 3:
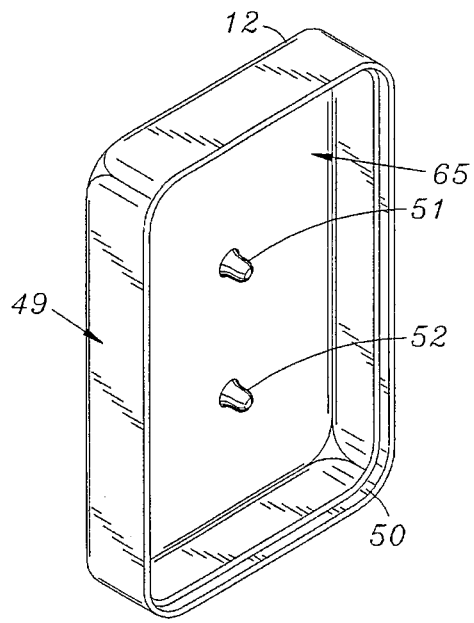
FIG. 3 is a perspective view of one element of the two-part mating elements which form the casing of the transmitter.

A radio hi-fidelity communication system comprises a transmitter 10 and a receiver 11. The transmitter 10 is located within a substantially sealed water-resistant casing 12. Within the casing 12 there is contained an audio frequency means 13, radio frequency means 14, antenna means 15 and rechargeable battery 16. A microphone 17 is connected by means of a wire 18 through the connector 19 which passes through an aperture in the top wall 20 of the casing 12. The microphone 17 is connected through line 21 with the audio frequency means 13.

The audio frequency means 13 and radio frequency 14 of the transmitter 10 are produced by Vega, a Mark IV Audio Company of El Monte, Calif. The audio frequency means 13 and radio frequency means 14 are those of a conventional transmitter used for wireless transmission save that the potentiometer is removed, so that volume control of the transmitter is not possible. This is set up in this manner because the electronics of the transmitter 10 are contained within the casing 12 and is not subject to variability.

There are also provided three RF inductors or chokes of 0.1 microHenry each. These chokes are illustrated by numerals 22, 23 and 24, respectively. Also associated with each choke and located over the conductor to each choke, there is a ferrite bead 25, 26 and 27, respectively. The chokes 22, 23 and 24 and beads 25, 26 and 27 act to shield the audio components from receiving RF signals from the antenna 15.

The antenna wire 15 contained within the casing 12 is also a modification of the standard AF and RF circuitry described. Normally, an antenna protrudes beyond the transmitter casing 12. However, antenna 15 in this situation is wholly within the casing. The circuit board or boards 28 for the AF means 13 and RF means 14 constitute a ground plane for the antenna wire 15. The wire 15 is diagonally disposed across the circuit board 28 in a substantially parallel relationship with the plane for the greater part of the length of the antenna 15. In this manner, the circuit board 28 acts as the ground plane for the antenna 15.

Within the casing 12, there is located a reed switch 29 which has two spaced elements 30 and 31 with contact 32 on element 31 for movable engagement and disengagement with element 30. The reed switch elements 30 and 31 are suitably connected in conventional fashion at location 33. Element 31 is connected by line 34 with the circuitry on the circuit board 28.

The reed switch 29 is operable by means of a switch activating member 35 located on the outside wall of the transmitter casing 12. The movable switch member 35 rides in two spaced-apart lips 36 and 37 which are formed in the outside wall 20 of the body of the casing 12. The lips 36 and 37 are formed by a substantially U-shaped rail member 38 which has a base 39, upstanding arms 40, and the internally directed lips 36 and 37.

Figure 4:
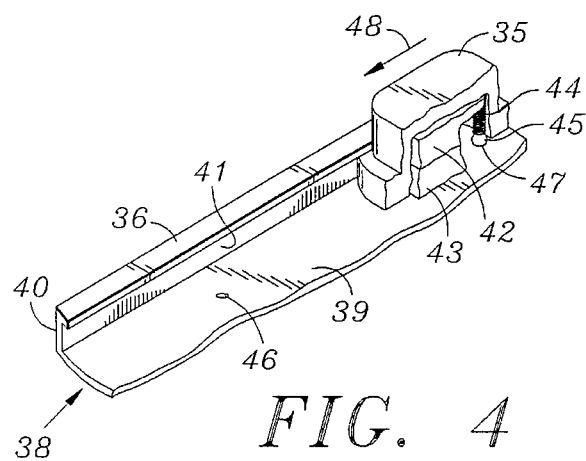
FIG. 4 is a perspective view showing, in cut-away view, the switch element for operating the transmitter.
Figure 5:
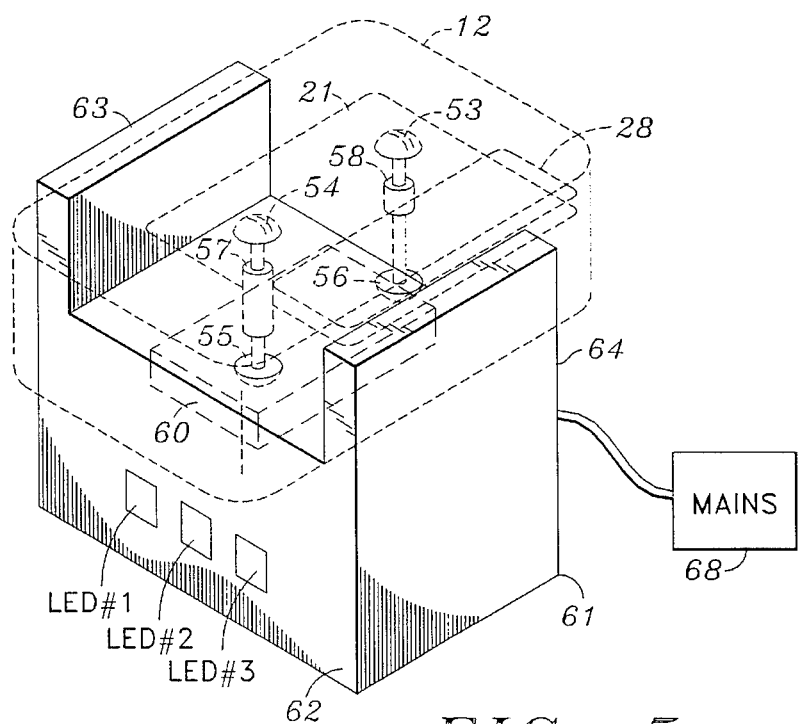
FIG. 5 is a perspective view illustrating the casing of the transmitter located on a rechargeable unit.
Figure 6:
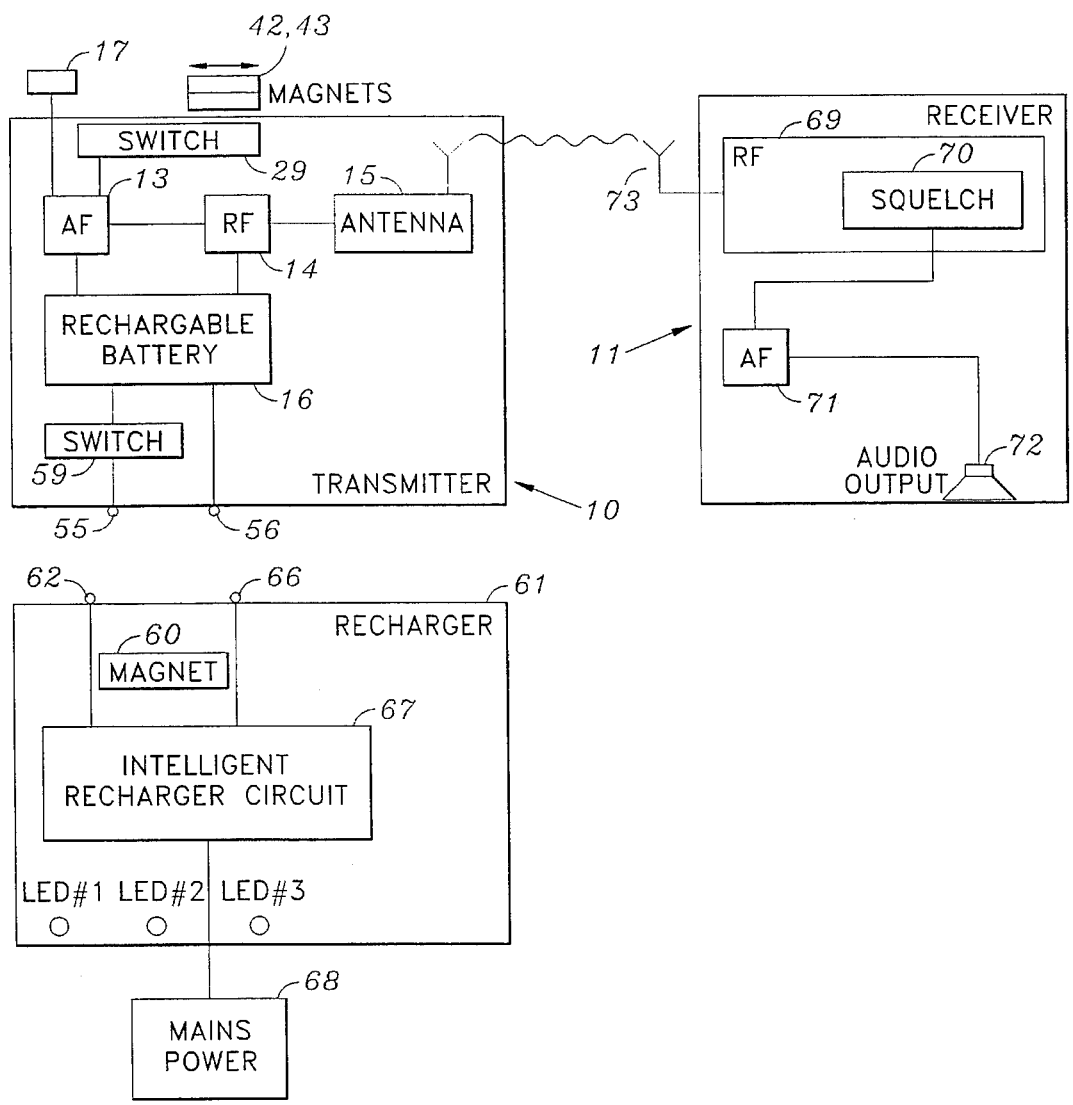
FIG. 6 is a block diagram illustrating the transmitter, recharger, and receiver with the main components of these elements.

Riding in the groove 41 and associated groove with the opposite lip 37 is the movable button switch 35 which is hollowed and contains two magnets 42 and 43 in sandwiched relationship. The magnets 42 and 43 activate the element 31 of the reed switch 29. There is also located in the hollowed portion of switch 35 a helical spring 44 which urges a ball bearing 45 downwardly to interact in hollowed out indents or holes 46 and 47 respectively. The button as shown in FIG. 4 is in the same position as illustrated in FIG. 1, and thus, the ball bearing 45 would be in hole 47 and would indicate an "on" position for the switch 29. If the button 35 is moved as indicated by arrow 48 to a second position in the track, the ball 45 would fall within hole 46 and the switch 29 would be in an "off" position. The location of the ball in either one of the holes 46 or 47 gives a positive indication of the on/off condition of the switch 29.

The casing 12 is formed of a polycarbonate material such as Lexan (Trademark, General Electric, Schenectady, N.Y.). The inside face 48 of the casing 12 is provided with a frosted or relatively roughened surface 65. The outside face 49 is relatively smooth. The casing 12 is constituted by two component parts and there is a peripheral lip 50 about the circumference of each of the component parts. The lips interengage each other in sealing relationship. When the casing 12 is tightly closed, it is water-impervious, namely substantially water-resistant. The casing 12 is also partly translucent. Should there be any moisture ingress within the interior of the casing 12, such moisture would fill part or whole of the roughened interface 48 such that the relatively rough appearance which is visible from the outside as a frosted effect would appear as laminar. Such laminar appearance is an indication of moisture seepage and the likelihood of deterioration of the transmitter 10.

Each half element of the casing 12 of the transmitter 10 is provided with two spaced indents 51 and 52, respectively. Screw means 53 and 54 pass through the one half element and a mating screw means 55 and 56 pass through the other elements. The heads of the screws rest in counter-sunk formations in the indents 51 and 52, respectively, of each of the elements of the casing 12. The leading ends of the screws engage respectively threaded ferrules 57 and 58. As the screw means 53 and 56 are drawn relatively together toward the ferrule 58, and the screw means 54 and 55 are drawn relatively together toward ferrule 57, the two sections of the casing 12 of the transmitter 10 are drawn together so that the lips 50 about the periphery of the casing elements form a tight seal. This sealing engagement is preferably affected at a factory assembly site such that the casing 12 can form a water-resistant factory set and regulated sealed casing for the transmitter 10.

The heads of screws 55 and 56 also constitute contacts for connection with the rechargeable battery 16 in the transmitter casing 12. A switch 59 between the contact 55 and the rechargeable battery 16 is operable by a magnet 60 in a rechargeable unit 61. The rechargeable unit 61 includes a base section 62 and two U-shaped arms 63 and 64, respectively, which forms a cradle to receive the transmitter 10.

When the transmitter 10 is correctly located in the cradle, the magnet 60 acts to close a switch 59 and thereby puts the contacts 55 and 56 in contact with elements 65 and 66 on the base of the recharger 61. When this happens, the recharger circuit 67 acts to recharge the rechargeable battery 16. The recharger 61 is powered from the main supply 68. The magnet 60 operates switch 59 to ensure that recharging is only affected when the switch 59 is closed. Thus, should the transmitter 10 be submerged in water, for instance salt water, the salt water cannot form a short circuit between contacts 55 and 56 to activate or deactivate the rechargeable battery 16. The magnet 60 is needed to place the switch contacts into an operative mode for recharging.

The recharger circuit 67 includes means for evaluating the charge condition of the battery 16. There are also means for indicating conditions of the battery between its state of discharge, fully charged or need for recharge. Such indicator may be on the transmitter 10 or on the recharge unit 61. A suitable LED system is provided for this. The ability of the recharge circuit 67 is to determine whether the battery is about 80% of full power. In such an event, the battery can be subjected to a deep discharge and thereafter recharged to condition the battery 60 in its appropriate manner to maintain a high quality performance. Alternatively, if the battery condition is appropriate, the battery can be trickle charged as necessary. At full voltage, the battery would operate at about nine volts.

The receiver 11 includes an RF section 69, which has a squelch section 70, an AF section 71 and an output 72 for outputting audio signals. The receiver is produced by Vega, the same entity that produces the transmitter. Such a receiver would have conventional squelch circuitry to monitor the input signal and ensure that an effective signal is obtained through the speaker 72. There is additionally provided a squelch circuit to deactivate the AF section 71 of the receiver 11. The input antenna 73 of the receiver 11 detects different RF signals from the environment.

Should the RF signal from the transmitter 10 disappear due to the submergence of the transmitter 10 below water, the squelch 70 of the receiver 11 is activated to ensure that the AF 71 is cut off so that there is no sound from the audio output 72. The squelch 70 is designed to monitor multiple, preferably three, different bands of audio input of different RF signals. At least one band is above the basic audio noise level. Any combination of two different signals from the band, but not three, would indicate that the transmitter 10 is being submerged. Thus, the squelch 70 would act to cut off the audio output 72.

The system of the invention is operable to provide a high-performance audio output in the range between 50 Hz to 15 KHz from a receiver 11. The transmitter 10 being encased in casing 12, which is essentially water-resistant, permits for long-term, stable operation without being subjected to deterioration due to water ingress. The wire connector 18 and connector 19 are of a nature that they are resistant to water pressures up to 1600 psi.

The switch 35 is essentially located outside of the casing and acts to operate with a switch within the casing in an effective manner to activate and deactivate the transmitter as appropriate. The long-term rechargeable battery in the casing provides for long-term stable operation of the device. Rechargeable unit 61 operates with the rechargeable battery in a manner to facilitate such long-term operation. Any moisture leakage is easily determined on the inside of the casing.

Many other forms of the invention exist, each differing from others in matters of detail only.

The invention is to be determined solely in terms of the following claims.

I claim:

1. A transmitter for high fidelity radio communication system comprising the transmitter and a remote receiver, the transmitter being within a substantially sealed water-resistant casing and having within the casing (i) audio frequency means, (ii) radio frequency means, (iii) antenna means, (iv) rechargeable battery means, (v) switch means in the casing operable from outside the casing for selectively activating the transmitter, means through the casing for connecting a microphone with the audio frequency means, means through the casing for connecting the rechargeable battery means with recharger means, and wherein the transmitter in activated mode transmits an audio signal inputted to the microphone via a radio frequency to the receiver, and wherein the casing is at least partly translucent, and provides a frosted inside face, and wherein the ingress of moisture to the inside of the casing is indicated by a laminar appearance caused by the interaction of moisture with the frosted inside face.

2. A transmitter as claimed in claim 1 including means for evaluating the charge condition of the rechargeable battery means, and including indicator means for indicating conditions between discharge, fully charged and recharge.

3. A transmitter as claimed in claim 1 including a recharger for receiving the casing, the recharger engaging the means for connecting with the rechargeable battery means, and the recharger providing selectively for deep discharging and recharging the rechargeable battery means, or trickle charging the rechargeable battery means.

4. A transmitter as claimed in claim 3 wherein the recharger for receiving the casing includes a cradle, the cradle including contact means associated with the recharger means, the contact means being for engaging the means on the casing for connecting with the rechargeable battery means.

5. A transmitter as claimed in claim 4 including recharge switch means in the casing operable to closure to permit recharging, the recharge switch means being activated mechanically by magnetic means in the cradle.

6. A transmitter system as claimed in claim 3 wherein the recharger for receiving the casing includes a cradle, the cradle including contact means associated with the recharger means, the contact means being for engaging the means on the casing for connecting with the battery.

7. A transmitter as claimed in claim 1 including applying a circuit board for the audio frequency means and radio frequency means, the circuit board being a ground for the antenna means, and including a wire element located in relation to the circuit board, the wire element being the antenna means and being arranged to be substantially parallel to the circuit board.

8. A transmitter as claimed in claim 1 wherein the switch means for the transmitter includes reed switch means and a magnetic interactive element, the magnetic interactive element being movable for operating with an interactive element of the reed switch means.

9. A transmitter as claimed in claim 1 wherein the remote receiver includes an audio output, and means with the remote receiver for squelching audio output signals from the remote receiver when signals received from the receiver indicate that the transmitter is submersed in water.

10. A transmitter as claimed in claim 1 wherein the casing includes two mating elements, the elements being of substantially similar profiles and each element including a peripheral lip, the respective lips being for mating sealing engagement.

11. A transmitter as claimed in claim 10 wherein screw means extends transversely from each element to engage threaded ferrule means located substantially centrally in the casing, the screws engaging the threaded ferrule means from opposite ends thereby to tighten the elements together about the lips.

12. A transmitter for high fidelity radio communication system comprising the transmitter and a remote receiver, the transmitter being within a substantially water-resistant casing and having within the casing (i) audio frequency means, (ii) radio frequency means, (iii) antenna means, including a circuit board for the audio frequency means and radio frequency means the circuit board being a ground for the antenna means, and including a wire element located in relation to the circuit board, the wire element being the antenna means and being arranged to be substantially parallel to the circuit board (iv) rechargeable battery means, means through the casing for connecting a microphone with the audio frequency means, means through the casing for connecting the rechargeable battery means with recharger means, and wherein the transmitter in an activated mode transmits an audio signal inputted to the microphone via a radio frequency to the receiver, and wherein the casing is at least partly translucent, and provides a frosted inside face, and wherein the ingress of moisture to the inside of the casing is indicated by a laminar appearance caused by the interaction of moisture with the frosted inside face.

13. A transmitter as claimed in claim 12 including switch means for the transmitter, the switch means having reed switch means and a magnetic interactive element, the magnetic interactive element being movable for operating with an interactive element of the reed switch means.

14. A transmitter as claimed in claim 12 including cradle means for receiving the casing, the cradle means including contact means associated with the recharger means, the contact means being for engaging the means on the casing for connecting with the rechargeable battery means.

15. A transmitter for a radio communication system comprising the transmitter and a remote receiver, the transmitter being within a substantially water-resistant case and having within the casing (i) audio frequency means, (ii) radio frequency means, (iii) antenna means, including applying a circuit board for the audio frequency means and radio frequency means the circuit board being a ground for the antenna means, and including a wire element located in relation to the circuit board, the wire element being the antenna means and being arranged to be substantially parallel to the circuit board, (iv) means through the casing for connecting a microphone with the audio frequency means, (v) switch means in the casing operable from outside the casing for selectively activating the transmitter, and wherein the transmitter in activated mode transmits an audio signal inputted to the microphone via a radio frequency to the receiver, and wherein the casing is at least partly translucent, and provides a frosted inside face, and wherein the ingress of moisture to the inside of the casing is indicated by a laminar appearance caused by the interaction of moisture with the frosted inside face.

16. A transmitter as claimed in claim 15 wherein the transmitter includes a rechargeable battery, and including a recharger for receiving the casing, the recharger engaging means for connecting with the rechargeable battery, and the recharger providing selectively for deep discharging and recharging the rechargeable battery, or trickle charging the rechargeable battery.

17. A transmitter as claimed in claim 16 including means for evaluating the charge condition of the battery, and including indicator means for indicating conditions between discharge, fully charged and recharge.

18. A transmitter as claimed in claim 15 including a circuit board for the audio frequency means and radio frequency means the circuit board being a ground for the antenna means, and including a wire element located in relation to the circuit board, the wire element being the antenna means and being arranged to be substantially parallel to the circuit board.

19. A transmitter as claimed in claim 15 wherein the switch means for the transmitter includes reed switch means and a magnetic interactive element, the magnetic interactive element being movable for operating with an interactive element of the reed switch means.

20. A transmitter for high fidelity radio communication system comprising the transmitter and a receiver, the transmitter being within a substantially sealed water-resistant casing and having within the casing (i) audio frequency means, (ii) radio frequency means, (iii) antenna means, (iv) rechargeable battery means, (v) switch means in the casing operable from outside the casing for selectively activating the transmitter, means through the casing for connecting a microphone with the audio frequency means, means through the casing for connecting the rechargeable battery means with recharger means, and wherein the transmitter in an activated mode transmits an audio signal inputted to the microphone via a radio frequency to the receiver, and wherein within the casing there are means responsive to the ingress of moisture to the inside of the casing and including means for indicating the ingress of moisture, the means for indicating the ingress of moisture being a frosted surface, such surface being for providing a laminar appearance caused by the interaction with moisture.

21. A transmitter as claimed in claim 20 including a circuit board for the audio frequency means and radio frequency means the circuit board being a ground for the antenna means, and including a wire element located in relation to the circuit board, the wire element being the antenna means and being arranged to be substantially parallel to the circuit board.

22. A transmitter as claimed in claim 21 wherein the switch means in the casing for the transmitter includes reed switch means and a magnetic interactive element, the magnetic interactive element being movable and for magnetically operating through the casing with an interactive element of the reed switch means in the casing.

23. A transmitter as claimed in claim 20 wherein the switch means in the casing for the transmitter includes reed switch means and a magnetic interactive element, the magnetic interactive element being movable and for magnetically operating through the casing with an interactive element of the reed switch means in the casing.

24. A transmitter for high fidelity radio communication system comprising the transmitter and a remote receiver, the transmitter being within a substantially water-resistant casing and having within the casing (i) audio frequency means, (ii) radio frequency means, (iii) antenna means, including a circuit board for the audio frequency means and radio frequency means, the circuit board being a ground for the antenna means, and including a wire element located in relation to the circuit board, the wire element being the antenna means and being arranged to be substantially parallel to the circuit board (iv) rechargeable battery means, means through the casing for connecting a microphone with the audio frequency means, conductor terminal means through the casing for connecting the rechargeable battery means with recharger means, and wherein the transmitter in an activated mode transmits an audio signal inputted to the microphone via a radio frequency to the receiver, and wherein within the casing there are means responsive to the ingress of moisture to the inside of the casing and including means for indicating the ingress of moisture.

25. A transmitter as claimed in claim 24 wherein the switch means for the transmitter includes reed switch means and a magnetic interactive element, the magnetic interactive element being movable and for magnetically operating through the casing with an interactive element of the reed switch means in the casing.

26. In a sealed water resistant casing, a communication means having within the casing (i) audio frequency means, (ii) radio frequency means, (iii) antenna means, (iv) rechargeable battery means, (v) switch means in the casing operable from outside the casing for selectively activating the communication means, means for operating the switch means not penetrating the casing, (vi) means through the casing for connecting a microphone with the audio frequency means, and wherein in activated mode an audio signal is inputted to the microphone, and (vii) the casing, being at least partly translucent and providing a frosted inside face, and wherein the ingress of moisture to the inside of the casing is indicated by a laminar appearance caused by the interaction of moisture with the frosted inside face.

27. A communication means as claimed in claim 26 wherein the switch means includes reed switch means and a magnetic interactive element, the magnetic interactive element being movable and for magnetically operating through the casing with an interactive element of the reed switch means in the casing.

28. The communication means as claimed in claim 26 including connecting means through the casing for connecting the rechargeable battery means with recharger means a pair of spaced conductive terminals.

29. A communication means as claimed in claim 26 wherein the switch means includes reed switch means and a magnetic interactive element, the magnetic interactive element being movable and for magnetically operating through the casing with an interactive element of the reed switch means in the casing.

30. In a sealed water resistant casing, a communication means having within the casing (i) audio frequency means, (ii) radio frequency means, (iii) antenna means, (iv) rechargeable battery means, (v) first switch means in the casing operable from outside the casing for selectively activating the communication means, the means for operating the first switch means not penetrating the casing, and (vi) second switch means operable from a location external to the casing, the second switch means being firstly for closing an electrical circuit in the casing for permitting recharging of the rechargeable battery means and for preventing activation of the communication means, and secondly for isolating the electrical circuit.

31. A communication means as claimed in claim 30 including means through the casing for connecting a microphone with the audio frequency means, and wherein in an activated mode an audio signal is inputted to the microphone.

32. A communication means as claimed in claim 30 the casing being at least partly translucent, and providing a frosted inside face, and wherein the ingress of moisture to the inside of the casing is indicated by a laminar appearance caused by the interaction of moisture with the frosted inside face.

33. A communication means as claimed in claim 30 wherein the switch means includes reed switch means and a magnetic interactive element, the magnetic interactive element being movable and for magnetically operating through the casing with an interactive element of the reed switch means in the casing.

34. The communication means as claimed in claim 30 including connecting means through the casing for connecting the rechargeable battery means with recharger means, the connecting means being a pair of spaced conductive terminals.

* * * * *